United States Patent [19]

Zondler et al.

[11] 4,163,098

[45] Jul. 31, 1979

[54] COATING COMPOUND BASED ON EPOXIDE RESIN, AN AMINE CURING AGENT, AND A HYDRAZONE MODIFIER

[75] Inventors: Helmut Zondler, Bottmingen; Wolfgang Schneider, Allschwil, both of Switzerland

[73] Assignee: Ciba-Geigy Corporation, Ardsley, N.Y.

[21] Appl. No.: 938,190

[22] Filed: Aug. 30, 1978

[30] Foreign Application Priority Data

Sep. 5, 1977 [CH] Switzerland ............... 10802/77

[51] Int. Cl.$^2$ ............................................. C08G 59/62
[52] U.S. Cl. ......................................... 528/99; 528/104
[58] Field of Search ............................ 528/99, 104

[56] References Cited
U.S. PATENT DOCUMENTS

| | | | |
|---|---|---|---|
| 3,278,596 | 10/1966 | Pursglove | 260/558 |
| 3,367,911 | 2/1968 | Daum et al. | 260/47 |
| 3,383,360 | 5/1968 | Harrison | 260/47 |

Primary Examiner—Earl A. Nielsen
Attorney, Agent, or Firm—Joseph F. DiPrima

[57] ABSTRACT

The coating compound according to the invention contains an epoxide resin, a diprimary amine curing agent and as modifier a hydrazone of the formula

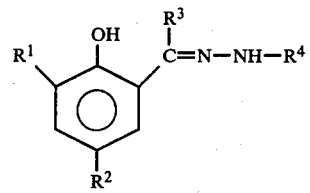

wherein the radical $R^1$–$R^4$ represent hydrogen or alkyl, provides after curing coatings having a smooth, lustrous and glass-like surface which has a good resistence to chemicals.

6 Claims, No Drawings

COATING COMPOUND BASED ON EPOXIDE RESIN, AN AMINE CURING AGENT, AND A HYDRAZONE MODIFIER

The use of aromatic amines, for example m-phenylenediamine or p,p'-diaminodiphenylmethane, either unmodified or in the form of epoxide adducts together with liquid epoxide resins based on aromatic or aliphatic parent substances (bisphenol-A diglycidyl ether or alkanolpolyglycidyl ether), as solvent-free coating systems is known. Products of this type are available commercially and, for the attainment of optimum processing properties, they can also contain modifiers (low-molecular mono- or diglycidyl compounds and also accelerators). The curing of the coatings is effected within the temperature range of 0°-30° C. The coatings obtained are distinguished by glass-like surfaces and by high resistance to chemicals, such as aliphatic hydrocarbons, alcohols, organic and inorganic acids and also alkalies. Their colour stability to the action of light leaves however much to be desired.

If in these systems the aromatic amines are replaced by aliphatic or cycloaliphatic amines (see for example O. Lissner *), colour-stable coatings are indeed obtained, but with considerably poorer properties from the point of view of lacquering, and with lower resistance to chemicals. In particular, the appearance of the coating when cured in the temperature range of 0°-30° C. in the presence of atmospheric moisture and $CO_2$ is very disadvantageously affected in that the lustre is impaired, and haziness, blushing and exudations occur, defects rendering the application of these curing agents for decorative coatings impossible. Systems of this kind are also not suitable for producing coatings which come into contact with foodstuffs, since the curing agents based on aliphatic, cycloaliphatic and araliphatic amines impart to the epoxide resin coatings inadequate resistance to organic acids (e.g. fruit juices).

*) O. Lissner, effect of compounds containing hydroxyl groups on the reaction of polyamines with epoxides, and the mechanical properties of the cured products; lectures, 10th FATIPEC Congress 1970, pages 319-332, Verlag Chemie GmbH Weinheim 1970.

According to research carried out by Lissner, it is possible by adding phenols, for example alkylphenols, or compounds containing methylol groups, to the above systems to obtain certain improvements, of which the better appearance of the coating is to be emphasised. Unsatisfactory aspects still remaining however are on the one hand the short pot life of the mixtures, and on the other hand the low resistance of the resulting coatings to organic acids, aqueous agents and alcohol solutions.

The result of using the said solvents is namely that constituents of the coating (film), particularly the phenols used as accelerators, are dissolved out, an effect which renders impossible the use of such systems in the foodstuffs industry.

Besides the high reactivity already mentioned, a further disadvantage is the inherent viscosity of these curing agents. Furthermore, it is necessary for reasons connected with processing, to mix and apply coating compounds of this type by means of heatable machines, a procedure which is both complicated and expensive.

From the German Offenlegungsschrift No. 2,612,211 and German Auslegeschrift No. 2,025,159, it is further known that by reaction of aliphatic amines with formaldehyde and phenol, it is possible to synthesise amine curing agents of which the mixtures with epoxides give coatings having good resistance to organic acids and to diluted alcohols. The appearance of the surface of such coatings is however according to our investigations less attractive than that of coatings produced with alkylphenol/amine adducts. The coatings are moreover very brittle. From the point of view of application, the high reactivity and viscosity of the curing agents of this class have to be considered a disadvantage since mixing and application by hand is not possible; machines therefore have to be employed for the purpose.

It has now been shown that, surprisingly, hydrazones of the formula I

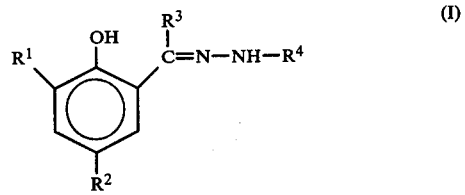

wherein $R^1$, $R^2$ and $R^3$ independently of one another represent hydrogen or an alkyl group having 1 to 12 carbon atoms, and $R^4$ represents hydrogen or an alkyl group having 1 to 4 carbon atoms, when contained in a coating compound based on an epoxide resin and a diprimary amine, eliminate the disadvantages mentioned. The hydrazone of the formula I can be replaced, in an amount of up to 35 mol percent, by a hydrazone of the formula II

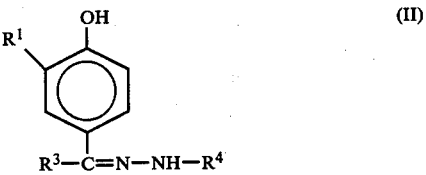

in which $R^1$, $R^3$ and $R^4$ have the same meanings as in the formula I. This is of importance to the extent that during the production of the hydrazones of the formula I by acylation of phenols, the subsequent Fries rearrangement and reaction with hydrazine in the case where phenols in which $R^2$ is hydrogen are used, there can also be formed hydrazones of the formula II. There is no need to subsequently separate these from those of the formula I.

The invention relates therefore to a coating compound containing an epoxide resin, a cycloaliphatic, aliphaticcycloaliphatic or araliphatic diprimary amine curing agent and a modifier for the curing agent, which coating compound contains as modifier a hydrazone of the formula I, there being to 1 mol of the diprimary amine 1 to 2 mols of the hydrazone of the formula I, which can be replaced to the extent of 35 percent by weight by a hydrazone of the formula II. Preferred hydrazones of the formula I are those in which $R^1$ and $R^4$ independently of one another represent hydrogen or the methyl group, especially hydrogen, and $R^2$ and $R^3$ independently of one another represent hydrogen or an alkyl group having 1 to 4 carbon atoms, with $R^2$ representing in particular hydrogen and $R^3$ in particular the methyl group. Corresponding preferences apply also to $R^1$, $R^3$ and $R^4$ of the formula II. Suitable curing agents are preferably 3-aminomethyl-3,5,5-trimethylcyclohexylamine or m-xylylenediamine.

The epoxide resins used are preferably the following:
bisphenol-A diglycidyl ether,
bisphenol-F diglycidyl ether,
glycidyl ethers of phenol/formaldehyde condensates (epoxide novolaks),
mixtures of these epoxide resins with
(a) glycidyl ethers of aliphatic polyols (butanediol, pentraerythritol),
(b) glycidyl esters of phthalic acid, hexahydrophthalic acid, tetrahydrophthalic acid.

The coating compound according to the invention can also contain organic and/or inorganic pigments for coloration. Furthermore, thixotropic agents, such as pyrogenic silicic acid, and so forth, and lacquer auxiliaries, such as levelling agents, dispersing agents and anti-setting agents, can be added to the coating compound.

After curing of the coatings within the temperature range of 0° to 30° C., the coatings provide a good surface resistance to chemicals, especially to aqueous solutions of alcohol or to organic acids. In contrast to the viscosity of the systems which are modified with a phenol and which are based on epoxide resin and a cycloaliphatic amine curing agent, the viscosity of the coating compounds according to the invention is not essentially altered, a factor which is of great importance with regard to processing: the coating can be applied by hand, that is to say, without the use of complicated and expensive machines. The novel coating compounds also have a somewhat lower reactivity, likewise a property which is essential for hand application. The coatings or films produced with the novel coating compounds have smooth, lustrous and glass-like surfaces without any tendency to exhibit blushing and exudations, irrespective of the conditions under which curing is performed.

PRODUCTION OF THE HYDRAZONES

The starting products, o- and p-hydroxyphenylaldehydes optionally substituted in the nucleus, such as salicylaldehyde, and hydroxyphenylalkyl ketones such as o-hydroxyacetophenone, can be synthesised in a known manner. o-Hydroxyphenylalkyl ketones are obtained for example by acylation of phenols with acid cholrides or with anhydrides and subsequent Friess rearrangement:

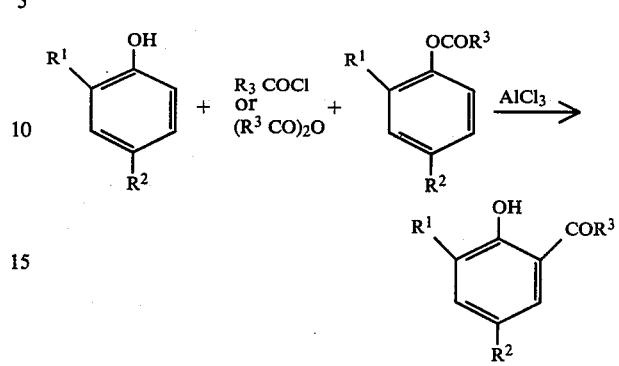

If there is a hydrogen atom ($R^2 = H$) in the p-position with respect to the OH group, there can be formed, besides the o-hydroxyphenylalkyl ketones, also the corresponding p-hydroxyphenylalkyl ketones.

The further reaction with hydrazine can be performed as follows: the stoichiometric amount, calculated relative to the ketone or the aldehyde, or a slight excess of at most 30 percent by weight, of hydrazine hydrate is stirred at room temperature in an organic solvent, and the aldehyde or the ketone is added dropwise. The temperature rises automatically as a result of the exothermic reaction. After completion of the dropwise addition, the mixture is boiled for a short time. On cooling, the formed hydrazone precipitates in some cases in crystalline form; in other cases the solvent is to be replaced by another to effect recrystallisation. Some hydrazones are liquid at room temperature and, after removal of the solvent, are either distilled or further processed as crude products. Further details regarding the reaction conditions and processing are shown in the Table I which follows.

Table 1

| Hydrazone | Z | Designation | Solutions | % Excess of hydrazine | Temp. °C. | Time | % Yield cryst. from solvent | m.p. °C. b.p./Torr |
|---|---|---|---|---|---|---|---|---|
| (structure with OH, CH3, C=NNH2, Z) | H | A | benzene | 30 | 80 | 4 hrs. | 91, benzene | 80–82 |
| | CH3 | B | C2H5OH | 10 | 78 | 15 min. | 95, cyclohexane | 81–82 |
| | C2H5 | C | " | 10 | 78 | 20 min. | 97, — | <25 |
| | CH(CH3)2 | D | " | 10 | 78 | 15 min. | 79, hexane | 48–50 |
| | C(CH3)3 | E | " | 10 | 78 | 15 min. | 69, cyclohexane | 96–99 |
| | CH(CH3)(C2H5) | F | " | 10 | 78 | 15 min. | 52, hexane | 61–63 |
| (structure with OH, C2H5, C=NNH2, Z) | N | G | CH3OH | 20 | 78 | 15 min. | 97, — | 114/0,001 |
| | CH3 | H | C2H5OH | 20 | 78 | 5 min. | 90, Cyclohexane | 57–60 |
| | C2H5 | I | " | 10 | 78 | 15 min. | 87, — | <25 |
| | CH(CH3)2 | J | " | 10 | 78 | 20 min. | 98, — | <25 |
| | (CH2)11CH3 | K | " | 10 | 78 | 30 min. | >95, — | <25 |
| (structure with CH3, OH, Z, C=NNH2, CH3) | CH3 | L | " | 10 | 78 | 15 min. | 92, cyclohexane | 88–89 |
| | C2H5 | M | " | 20 | 78 | 15 min. | 90, " | 83–84 |
| | n-C3H7 | N | " | 10 | 78 | 15 min. | 73, hexane | 87–88 |

Table 1-continued

| Hydrazone | Z | Designation | Solutions | Reaction conditions % Excess of hydrazine | Temp. °C. | Time | % Yield cryst. from solvent | m.p. °C. b.p./Torr |
|---|---|---|---|---|---|---|---|---|
| OH, Z, C=NNH$_2$ (on benzene ring) | n-C$_4$H$_9$ | O | C$_2$H$_5$OH | 10 | 78 | 15 min. | 98, — | <25 |
|  | (CH$_2$)$_{10}$CH$_3$ | P | CH$_3$OH | 20 | 65 | 15 min. | 89, methanol | 64–5 |
| OH, Z, C=NNH$_2$, CH$_3$ (on benzene ring) | n-C$_3$H$_7$ | Q | C$_2$H$_5$OH | 10 | 78 | 10 min. | 89, cyclohexane | 85–7 |
| OH, CH=NNHZ (on benzene ring) | H | R | (CH$_3$)$_2$CHOH | 15 | 68 | 1 hr. | 97, isopropanol | 96–97 |
|  | CH$_3$ | S | " | 0 | 82 | 15 min. | 99, — | <25 |
| OH, CH$_3$, C=NNHCH$_3$ (on benzene ring) | — | T | CH$_3$OH | 0 | 65 | 90 min. | 76, — | 97/0,01 |

EXAMPLES 1-11

Coating Compounds 100 g of a polyglycidyl ether with is liquid at room temperature, which has been produced by condensation of bisphenol-A with epichlorohydrin in the presence of alkali, and which has an epoxide content of 5.2 epoxide equivalents/kg and a viscosity of 8000–12000 mPa s at 25° C., is mixed with x g of a solution of a hydrazone of the Table 1 in an amine (IPD=isophoronediamine=3-aminomethyl-3,5,5-trimethylcyclohexylamine or MXDA=metaxylylenediamine). The viscosity of the solutions immediately after mixing is 1500±500 mPa s (according to DIN 53015 at 25° C.).

The following properties are then determined by tests on these coating compounds:

the gelling time of the mixture;
the film curing time; and
the resistance to chemicals, particularly to chemicals constituting suitable simulators with regard to application of the coating compounds in the foodstuffs industry.

The results are summarised in the Tables 2 and 3.

For the purpose of comparison, there are given in the Tables also the values obtained using coating compounds produced without hydrazone; in the Examples a, b and e are shown the values obtained without the addition of a modifier, and in the Examples c, d, f and g the values with the addition of nonylphenol (NP) as modifier.

Test Methods

1. Viscosity: according to DIN 53015 (at 25° C. in mPa s).
2. Gelling time: 100 ml of mixture in aluminium cup (diameter 7 cm, height 6 cm) at 20° C. with 65% relative humidity.
3. Film curing: 200 μm thick films, applied by means of a commercial bar coater (Erichsen, West Germany), are cured at 20° C. with 65% relative humidity. The drying time is measured using a commercial drying-time measuring apparatus (Erichsen, apparatus type 335).
4. Resistance to chemicals: on approximately 300 μm thick films on sand-blasted steel sheet; curing time 10 days at 20°-22° C. with 65% relative humidity; immersion temperature 20°-22° C.; duration of test 3 months or up to point of destruction of the coating material. The assessment is made visually:

OK=film is in order and still unchanged after three months;

D.=film is destroyed, i.e. protection of the substrate by the coating material is no longer ensured: the test medium is in contact with the substrate.

Table 2

Coating compounds based on isophoronediamine (IPO) and hydrazones of the formula I

| Example No. | Amount of IPD in g | Modifier Designation | g | Gelling time in minutes | Film curing in hours | Resistance to deion. water | ethanol 50% | acetic acid 10% | lactic acid 20% |
|---|---|---|---|---|---|---|---|---|---|
| 1 | 16 | A | 14 | 120 | 14 | OK | OK | OK | OK |
| 2 | 12 | A | 20 | 180 | 29 | OK | OK | OK | OK |
| 3 | 16 | B | 14 | 130 | 16 | OK | OK | OK | OK |
| 4 | 16 | H | 15 | 130 | 18 | OK | OK | OK | OK |
| 5 | 16 | J | 17 | 150 | 21 | OK | OK | OK | OK |
| 6 | 16 | M | 17 | 130 | 20 | OK | OK | OK | OK |
| 7 | 16 | P | 25 | 130 | 20 | OK | OK | OK | OK |
| 8 | 16 | A+U* | 10+4 | 130 | 10 | OK | OK | OK | OK |
| a | 23 | — | — | 80 | 8 | OK | softened | 1 day D. | 1 day D. |
| b | 16 | — | — | 130 | 20 | OK | 2 weeks D. | 3 days D. | 1 week D. |
| c | 23 | NP | 29 | 30 | 5 | OK | softened | swelled | swelled |

Table 2-continued

Coating compounds based on isophoronediamine (IPO) and hydrazones of the formula I

| Example No. | Amount of IPD in g | Modifier Designation | Modifier g | Gelling time in minutes | Film curing in hours | Resistance to deion. water | ethanol 50% | acetic acid 10% | lactic acid 20% |
|---|---|---|---|---|---|---|---|---|---|
| d | 23 | NP | 57 | 15 | 3 | OK | 2 weeks D. | OK | OK |

U* is the hydrazone of the formula II wherein $R^1$ and $R^4$ represent hydrogen, and $R^3$ represents the methyl group

Table 3

Coating compounds based on m-xylenediamine (MXDA) and hydrazones of the formula I

| Example No. | Amount of MXPA in g | Modifier Designation | Modifier g | Gelling time in minutes | Film curing in hours | Resistance to deion. water | ethanol 50% | acetic acid 10% | lactic acid 20% |
|---|---|---|---|---|---|---|---|---|---|
| 9 | 14 | A | 15 | 80 | 7 | OK | OK | OK | OK |
| 10 | 10 | A | 21 | 120 | 12 | OK | OK | OK | OK |
| 11 | 14 | A+U* | 10+5 | 80 | 5 | OK | OK | OK | OK |
| e | 18 | — | — | 75 | 3 | OK | OK | 3 days D. | 1 week D. |
| f | 18 | NP | 29 | 15 | 2 | OK | softened | OK | OK |
| g | 18 | NP | 62 | 10 | 2 | OK | 1 month D. | softened | OK |

U* see Table 2

EXAMPLE 12

100 g of a polyglycidyl ether which is liquid at room temperature, which is produced by condensation of bisphenol-A with epichlorohydrin in the presence of alkali, and which has an epoxide content of 5.2 epoxide equivalents/kg and a viscosity of 8000–12000 mPa s at 25° C., is mixed with 20–50 g of titanium dioxide (rutile type),
10–30 g of barium sulfate,
1–3 g of thixotropic agent ("Aerosil 380"),
0.5–2 g of ethanol,
0.2–1 g of a dispersing auxiliary ("Borchigen STL"),
0.1–1 g of levelling agent ("Fluorochemical 430", 10% in toluene); the mixture is homogenised in a high-speed stirrer, and subsequently ground in a 3-roll mill. Before processing, the resin paste is mixed with 16 g of isophoronediamine and
14 g of modifier A (see Table 1).

The catalysed coating compound gives a gelling time of about 2 hours at 20° C. A 300 μm thick film is bone-dry after 16 hours. The film cured for 10 days at room temperature is resistant to diluted aqueous organic and inorganic acids, to alkalies and to salt solutions, and also to 50% ethyl alcohol.

We claim:

1. A coating composition comprising an epoxide resin, a cycloaliphatic, aliphatic-cycloaliphatic or araliphatic diprimary amine curing agent and a modifier for the curing agent, which coating compound contains as modifier a hydrazone of the formula I

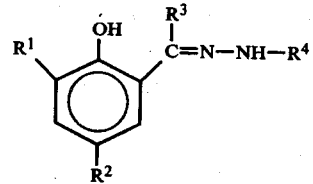

wherein $R^1$, $R^2$ and $R^3$ independently of one another represent hydrogen or an alkyl group having 1 to 12 carbon atoms, and $R^4$ represents hydrogen or an alkyl group having 1 to 4 carbon atoms, there being to 1 mol of the diprimary amine 1 to 2 mols of the hydrazone of the formula I, which can be replaced to the extent of 35 mol percent by a hydrazone of the formula II

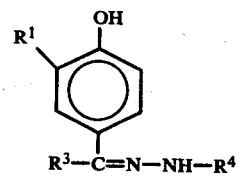

in which $R^1$, $R^3$ and $R^4$ have the same meanings as in the formula I.

2. A coating composition according to claim 1 wherein $R^1$ and $R^4$ in the formula I independently of one another represent hydrogen or the methyl group, and $R^2$ and $R^3$ independently of one another represent hydrogen or an alkyl group having 1 to 4 carbon atoms.

3. A coating composition according to claim 1 wherein $R^1$, $R^2$ and $R^4$ in the formula I represent hydrogen, and $R^3$ represents the methyl group.

4. A coating composition according to claim 1, which contains 3-aminomethyl-3,5,5-trimethylcyclohexylamine or m-xylylenediamine as the curing agent.

5. A coating composition according to claim 1, which contains to 1 mol of the diprimary amine about 1 mol of hydrazone.

6. A coating composition according to claim 1, which contains an organic and/or inorganic pigment, a thixotropic agent and/or a lacquer auxiliary.